United States Patent Office 3,376,286
Patented Apr. 2, 1968

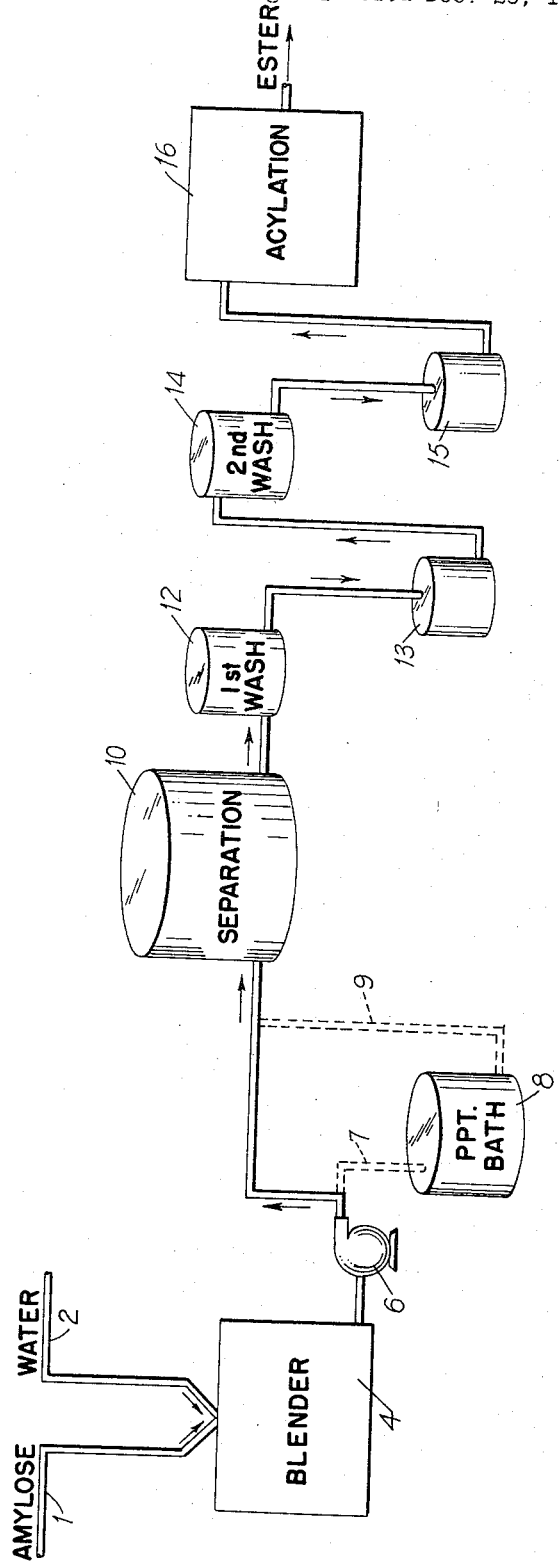

3,376,286
PREPARATION OF AMYLOSE ESTERS FROM ACTIVATED AMYLOSE
Felix J. Germino, Peekskill, N.Y., and Raymond J. Moshy, Westport, Conn., assignors to American Machine and Foundry Company, a corporation of New Jersey
Original application Dec. 29, 1960, Ser. No. 79,427, now Patent No. 3,184,335, dated May 18, 1965. Divided and this application July 24, 1964, Ser. No. 397,050
5 Claims. (Cl. 260—233.5)

This application is a division of our application Ser. No. 79,427 filed Dec. 29, 1960, now U.S. Patent 3,184,335 of May 18, 1965.

This invention relates to the activation of amylose for the purpose of enabling the derivatization of the activated product. More particularly, the present invention relates to the activation of amylose by partial disruption of the amylose hydrogen bonds brought about by swelling the amylose as distinguished from the activation methods in which amylose is solubilized.

Amylose, the linear fraction of starch, is obtainable commercially. With a few significant exceptions, it has chemical and physical similarity to cellulose. Amylose is a polyglucose linked by $\alpha$-1,4 bonds and cellulose is a polyglucose linked by $\beta$-1,4 bonds. This is the one notable chemical distinction between the two polymers. The $\alpha$ linkage, however, makes amylose digestible by amylase enzymes and thereby useful as a food ingredient, while the $\beta$ linkage makes cellulose indigestible. The alpha configuration makes the glucose monomers of amylose spiral so that the whole amplose polymer has a helical configuration. The cellulose polymer, on the other hand, is a linear rigid structure which is extensively hydrogen bonded and as a consequence is relatively much more insoluble than the amylose polymer. Commercial amylose is substantially insoluble in water. At normal pressure amylose is generally substantially insoluble in water at any temperature i.e. generally less than 1% soluble. This is due to retrogradation of amylose, a condition in which amylose is a dense highly oriented or crystalline form. Retrograded amylose in the inactive or retrograded form has little utility. It is substantially insensitive to amylolysis and is water insoluble. From a practical standpoint, it is chemically unreactive and requires extreme conditions, which usually cause molecular degradation, in order to effect chemical reaction to produce the derivative or useful form of amylose. Activated amylose, on the other hand, is capable of being derivatized under mild conditions with minimum degradation to form a variety of useful compounds.

Various techniques for preparing activated amylose have been attempted in the past. Insofar as known all prior techniques have been cumbersome, have substantially degraded the product and have been time consuming and impractical for producing activated amylose on any sizable scale.

The present invention provides a novel efficient continuous process which because of its process temperature and rapid activation precludes molecular degradation and/or bacterial spoilage of the amylose, a condition which has been a serious drawback in prior art procedures which employed long aqueous soak periods, e.g. in the order of 24 to 48 hours. The rapid process obviates the need for holding tanks and storage area thus substantially minimizing costs. Further, the invention provides an efficient end product providing derivatives having an excellent degree of substitution.

It is accordingly an object of the present invention to provide an improved and practical method for the activation of amylose through the partial disruption of the ordered structure of retrograded amylose.

It is a further object of the invention to provide activated amylose product economically in relatively high yields by a continuous process.

It is another object of the present invention to provide an improved method for obtaining derivatives of amylose.

It is still a further object of the invention to provide novel derivatives of amylose.

Additional objects and advantages of the invention will become apparent from the description of the invention hereinbelow.

In general this invention concerns the pretreatment of amylose for the purpose of activating this material. Activation being a practical requisite for chemical derivatization of amylose. The extreme resistance of amylose is such that when chemical reaction of this material is forced, a serious degree of breakdown in the chemical links of the amylose polymer occur. As a consequence, amylose so degraded substantially loses its attractive properties, e.g. films prepared therefrom have a significantly decreased strength. Preferably the treatment of the amylose should be relatively mild in order that the molecular weight is not substantially diminished.

The essence of the present invention resides in the discovery that relatively brief treatment of amylose with water results in suitable activation whereas heretofore it was considered necessary that long periods of the order of 24 to 48 hours were required to effect activation. The activation by partial swelling of the amylose according to the invention is believed due to penetration through the non-reactive surface. According to the partial disruption, the penetration of water into the amylose is sufficiently effected within the first few hours of immersion of the dispersed amylose in water. Further treatment is unnecessary and, in fact, prolonged soaking is a definite disadvantage, being accompanied generally by bacterial attack on the amylose.

The invention, in particular, concerns improved means to obtain activated amylose in relatively high yields, i.e. in the order of about 90% and greater by using practically effective and efficient procedure. The method of the present invention disrupts the hydrogen-bonded structure in retrograded amylose by replacing glucose cross hydrogen bonds with glucose to water hydrogen bonds. The advantage of this method is that true solution does not occur. This avoids the complications encountered when starting from water solutions of amylose. The activation by partial disruption according to the invention does not activate amylose in the same sense that amylose is activated by dissolution in water such as by autoclaving at high temperature and pressure as occurs when amylose is heated at about 160° C. under 90 p.s.i. pressure. In the latter case, amylose is in true solution and is completely hydrated. In the present case, the activation treatment does not cause solution but partially hydrates the amylose. In a sense, it causes small breaks or fissures in the retrograded structure which then allow the reactant to permeate the structure and more facile chemical reactions ensue.

By the process of the invention, amylose derivatives having a relatively high degree of substitution (DS) of about 3, which is maximum, are obtained. "Degree of substitution" contemplates the conversion of activated amylose such that the hydroxyl groups of each unit of the amylose molecule are substituted in the formation of the derivatives. Of the 3 available hydroxyl groups per glucose unit, i.e. a degree of substitution of 3, it is desirable that at least a degree of substitution of about 2.0 and preferably a degree of substitution close to 3 be obtained in the course of amylose derivatization. Derivatization of amylose is considered unsatisfactory from a practical standpoint in the case of acetate derivatives for example when 100% of the product has a degree of substitution below about 1.5. With derivatives having longer chain lengths, i.e., having a chain length above about 4 carbon atoms, a degree of substitution somewhat this value may be appropriate.

The present invention provides a process whereby a reactive form of amylose is produced by partially disrupting the ordered structure of retrograded (unreactive) amylose. In the activating treatment the solid state of the amylose is substantially maintained.

The relatively simple activation procedure for amylose according to the invention provides a product which is stable, relatively active material and which is capable of forming a product having a high degree of substitution.

Activated amylose as contemplated herein, involves the treatment of amylose with a reagent therefor which merely acts on the inter-molecular hydrogen bonds of the amylose without effecting significant solubilization of the amylose. The treatment, however, has a substantial influence on the solid amylose which provides the basis for the chemical change, i.e., formation of derivatives from the activated amylose. In the absence of this treatment the amylose is relatively inactive and non-productive of derivatives.

The procedure of the invention is illustrated by the single figure of the drawing (depicting generally the process of the invention) in conjunction with the following description.

Activation of amylose according to the invention is effected by dispersing the amylose in an aqueous medium and mixing for a period, dependent on the temperature, varying from about 0.5 minute to about 4 hours. Temperatures of from about room temperature 25° C. to about 100° C. may be employed. Lower temperatures may be used although no practical advantage is known for slowing the activation procedure by use of temperatures below about 20° C. As a general rule, conditions in which temperatures ranging from about 25° C. to about 100° C. for periods ranging inversely from about 3 hours to about 30 seconds, respectively, and depends on the nature of the starting amylose and the degree of activation desired. As shown in the flow diagram amylose and water streams 1 and 2, respectively, are fed into the blender 3 where the amylose is intimately dispersed. Where retention periods longer than about 15 minutes are used holding tanks (not shown) may be employed.

In preparing the activating solutions, concentrations of amylose in the solvent as low as 1% may be used. Preferably concentrations between about 3 and 23% are used but good results may be obtained with concentrations as high as about 25% at atmospheric pressure. At higher solids contents the slurry is very viscous and presents some difficulty in handling. Most desirably concentrations of amylose between about 3 and 20% are employed. Water alone is a suitable dispersing activation medium for the amylose although the addition of minor amounts of organic liquids which are miscible with water and which do not substantially dissolve amylose such as dimethyl acetamide or methyl pyrrolidone are not precluded. The dispersed amylose is thereafter transferred as by pump 6 and suitably separated by any convenient means at 10 such as by filtering, by decanting or by centrifuging. Preferably the amylose is first precipitated by passage into a bath through line 7 comprising a suitable organic non-solvent liquid which is miscible with water and in which the amylose is insoluble. As used herein, the term precipitated is applied to the dehydration of that portion of the amylose which is swollen by the dispersing treatment. Organic non-solvent liquids of this type are known and readily characterizable as suitable by those skilled in the art. Included for example are glacial acetic acid, propionic acid, butyric acid, methanol, ethanol, propanol, acetone, methyl ethyl ketone, dioxane and the like. Where the precipitation step is used, the precipitated slurry withdrawn at 9 is then introduced into a suitable separation apparatus 10 where the amylose is separated from the aqueous-organic medium. The separated amylose is thereafter washed by blending at 12 with an organic non-solvent liquid, separated at 13, given a final wash while blending at 14 with a non-reactive organic liquid and separated at 15. Preferably the final wash employs an acid having a common acyl group with the amylose ester to be derived. For example in the preparation of amylose acetate the final wash preferably contains glacial acetic acid. Following the final wash, the amylose now in activated stage is reacted at 16 by procedures known in the art to form useful derivatives. In the preparation of esters the activated amylose is reacted with the appropriate acyl compound such as acid anhydrides and acyl chlorides in the presence of a suitable catalyst.

The following examples relating to the activation of amylose in solution further illustrate the invention and its advantages.

Example 1

A commercial amylose was introduced into a blender concurrently with hot water 95°–100° C. at the rate of 20 parts of amylose to 200 parts of water. The holding time was 10 minutes. The aqueous slurry from the blender is thereafter precipitated by the introduction thereof into a methanol bath where the aqueous slurry is thoroughly mixed. Holding time in the methanol bath is 3–4 minutes. The precipitated amylose is separated from the aqueous medium, washed once with methanol and twice with glacial acetic acid. The reactive amylose is readily reactive to produce derivative in excellent yields.

Where reacted with acetic anhydride in the presence of sulfuric acid as catalyst, a yield of 97.5% of amylose acetate is obtained. The product has a degree of substitution of 2.85. A film prepared from this product dissolved in chloroform was clear and lustrous and had a tensile strength of 6000 p.s.i.

Example 2

Commercially available amylose is fed into a blender concurrently with hot water (99° C.) at the rate of 20 parts of amylose to 200 parts of water. The holding time after thoroughly blending the amylose in water is one minute. The aqueous slurry from the holding tanks is fed into a glacial acetic acid precipitating bath and thoroughly mixed. Holding time in the acetic acid bath is 2 minutes. Where the solid portion of the amylose is precipitated, the amylose from the precipitation step is separated from the aqueous medium by filtration and washed twice with glacial acetic acid. Amylose acetate is readily prepared from this activated amylose by a conventional procedure. Upon reaction with acetic anhydride sulfuric acid as catalyst, a yield of 93% amylose acetate having a degree of substitution 2.6 is obtained. A film prepared therefrom was comparable to that of Example 1.

Example 3

Commercially available amylose is fed into a blender concurrently with water 22° C. at the rate of 40 parts of amylose to 250 parts of water. The holding time after thoroughly blending the amylose in water is 2 hours. The aqueous slurry from the holding tanks is fed into a methanol precipitating bath and thoroughly mixed. Holding time in the methanol bath is 2 minutes. Where the solid portion of the amylose is precipitated, the amylose from the precipitation step is separated from the aqueous medium by filtration, and washed three times with glacial acetic acid. Amylose acetate is readily prepared from the thus treated amylose by a conventional procedure. Upon reaction with acetic anhydride sulfuric acid as catalyst, the yield of 94% amylose acetate having a degree of substitution 3.0 is obtained. The product forms excellent films.

Example 3(A)

The procedure of Example 3 is substantially repeated with the exception that the product washed with glacial acetic acid is reacted with a mixture of acetic anhydride and butyric anhydride in the ratio of 2.5:1 in the presence of sulfuric acid as catalyst. A 90% yield of the mixed ester is derived having a degree of substitution of 1.95 acetyl groups of 0.85 butyryl groups. In a like manner a mixed ester of acetate and propionate as well as other combinations may be prepared by suitably reactions.

Example 4

Commercially available amylose is fed into a blender concurrently with water at the rate of 15 parts of amylose to 125 parts of a mixture of water and dimethylacetamide (7:4) and held at a temperature of 60–70° C. for 3 minutes. A further holding time after thoroughly blending the amylose in the aqueous mixture of 12 minutes at a temperature maintained 25° C. is employed. The aqueous slurry from the holding tanks is precipitated with glacial acetic acid and separated from the aqueous medium by filtration and washed two times with glacial acetic acid. Amylose acetate prepared from this activated amylose by reaction with acetic anhydride employing sulfuric acid as catalyst gave a yield 93% amylose acetate having a degree of substitution of 2.96. The product yields good films.

Example 5

Commercially available amylose is fed into a blender concurrently at the rate of 30 parts of amylose to 100 parts of a mixture of water and dimethylacetamide (6:4 ratio) at 94° C. The holding time after thoroughly blending the amylose in the aqueous mixture is 20 minutes at temperature maintained 80°–90° C. The aqueous slurry from the holding tanks is fed into a methanol precipitating bath and thoroughly mixed. Holding time in the methanol bath is 2 minutes. Where the solid portion of the amylose is precipitated, the amylose from the precipitation step is separated from the aqueous medium by filtration, washed once with methanol, once with glacial acetic acid and given a final wash with glacial acetic acid. Amylose acetate is readily prepared from this treated amylose by a conventional procedure. Upon reaction with acetic anhydride with sulfuric acid as catalyst, the yield 96% amylose acetate having a degree of substitution of 2.87 is obtained. The product dissolved in chloroform when cast on glass plate yields films of good strength and clarity.

Example 6

Commercial amylose is fed into a blender concurrently with water (35° C.) at the rate of 20 parts of amylose to 200 parts of water. The holding time after thoroughly blending the amylose in water is 2 hours. The aqueous slurry from the holding tanks is fed into a propionic acid precipitating bath and thoroughly mixed. Holding time in the acid bath is 2 minutes. The amylose from the precipitation step is separated from the aqueous medium by filtration and washed three times with propionic acid. Amylose propionate is prepared from the thus treated amylose by reacting the activated amylose with propionic anhydride using sulfuric acid as catalyst. A yield of 91% amylose propionate having a degree of substitution of 2.7 is obtained. Films prepared from a solution thereof cast on a stainless steel belt were clear and had an average tensile strength of 5000 p.s.i.

Example 7

Commercial amylose is fed into a blender concurrently with water (45° C.) at the rate of 20 parts of amylose to 100 parts of water. The holding time after thoroughly blending the amylose in water is 20 minutes at temperature maintained 70–75° C. The aqueous slurry from the holding tanks is fed into a methanol precipitating bath and thoroughly mixed. Holding time in the methanol precipitating bath is 2 minutes. The amylose from the precipitation step is separated from the aqueous medium by filtration, washed once with methanol and twice with butyric acid. Amylose butyrate is readily prepared from the thus treated amylose by reaction of the activated amylose with butyric anhydride using sulfuric acid as catalyst. A yield 90% butyrate having a degree of substitution 2.4 is obtained. The product forms suitable molded articles.

Example 8 (Comparative)

Commercial amylose is fed into a blender concurrently with methanol (25° C.) at the rate of 40 parts of amylose to 200 parts of methanol. The holding time after thoroughly blending the amylose in methanol is 2 hours. The slurry from the holding tanks is separated from the methanol medium by filtration, washed once with methanol and three times with glacial acetic acid. In an effort to prepare amylose acetate from the thus treated amylose by the conventional procedure of reacting with acetic anhydride in the presence of sulfuric acid as catalyst, a relatively unattractive amylose acetate product having a DS of 0.73 and a yield of 76.5% is obtained. This run illustrates the necessity of aqueous activating medium. Methanol is not a good activating medium.

Example 9 (Comparative)

Commercially available amylose is fed into a blender concurrently at the rate of 40 parts of amylose to 200 parts of glacial acetic acid at 25° C. The holding time after thoroughly blending the amylose in the acid is 2 hours. The slurry from the holding tanks is separated from the medium by filtration, washed with glacial acetic acid. Amylose acetate prepared from the thus treated amylose by the conventional procedure of reacting it with acetic anhydride in the presence of sulfuric acid as catalyst gave a yield of 69% amylose acetate having a degree of substitution of 0.74. The necessity of water as the activating medium is apparent in this run also.

Example 10 (Comparative)

Commercially available amylose is fed into a blender concurrently with water (25° C.) at the rate of 40 parts of amylose to 250 parts of water. The holding time after thoroughly blending the amylose in water is 24 hours. The amylose is separated from the aqueous medium by centrifugation and washed four times with glacial acetic acid. Amylose acetate prepared from the thus treated amylose by reaction with acetic anhydride using sulfuric acid as catalyst gave a yield 97% amylose acetate having a degree of substitution of 2.85. However, due to the long contact period with water the amylose product suffers from substantial deterioration. Deterioration in amylose is found following immersion in water for periods in excess of about 6–8 hours. As a consequence it is advantageous that activation by procedures requiring shorter contact periods be employed.

Intrinsic viscosity measurements on this activated product show a substantial decrease in molecular weight relative to the activated product prepared in Example 3 wherein an aqueous activation period of two hours is employed.

Amylose derivatives prepared from the activated amylose according to the invention may usefully be employed as film forming composition, as molding compositions, fiber forming material, in protective coatings, adhesives and the like.

In the use of amylose derivatives, various additives may be introduced into compositions thereof as is known in the art. For example, suitable quantities of plasticizer e.g. dibutyl phthalate may be incorporated in the formation of films.

In the practice of the invention, it is possible to replace up to about 10 to 35% or more of the amylose with amylopectin without substantially impairing the character of the derivative obtained.

What is claimed is:
1. The method of preparing amylose esters comprising partially swelling the amylose in an aqueous medium in a period not exceeding 4 hours, precipitating the swollen amylose with an organic liquid compound which is miscible with water but which is a non-solvent for amylose, separating the solid amylose from the liquid phase, washing said amylose with an organic non-aqueous non-solvent liquid and reacting said product with an acyl compound.

2. The method of claim 1 in which the ester is amylose acetate, the non-aqueous non-solvent is glacial acetic acid and the acyl compound is acetic anhydride.

3. The method of claim 1 in which the ester is amylose propionate, the non-aqueous non-solvent is propionic acid and the acyl compound is propionic anhydride.

4. The method of claim 1 in which the ester is amylose butyrate, the non-aqueous non-solvent is butyric acid and the acyl compound is butyric anhydride.

5. The method of claim 1 in which mixed esters are prepared by reacting the activated amylose with a mixture of the corresponding acyl compounds.

References Cited

Wolff et al.: Industrial and Engineering Chemistry August 1957, vol. 49, No. 8, pp. 1247–1248, TPI A58 (copy in Scientific Library).

Wolff et al.: "The Acylation of Corn Starch, Amylose and Amylopectin," J.A.C.S. 73, 346–49 (1951).

DONALD E. CZAJA, *Primary Examiner.*

CHARLES B. PARKER, *Examiner.*

R. W. MULCAHY, D. R. MAHANAND,
*Assistant Examiners.*